M. C. LEE.
CAKE MOLDING PAN.
APPLICATION FILED JAN. 28, 1916.

1,231,626.

Patented July 3, 1917.

Mary C. Lee, Inventor

By Joel N. Moris.

Witness

Attorney

UNITED STATES PATENT OFFICE.

MARY C. LEE, OF CHAMPAIGN, ILLINOIS.

CAKE-MOLDING PAN.

1,231,626.      Specification of Letters Patent.      Patented July 3, 1917.

Application filed January 28, 1916. Serial No. 74,794.

*To all whom it may concern:*

Be it known that I, MARY C. LEE, a citizen of the United States, residing at Champaign, in the county of Champaign and State of Illinois, have invented a new and useful Improvement in a Cake-Molding Pan, of which the following is a specification.

This invention relates to a molding pan for baking cake and the like and the main object of the invention is to provide a device of said character which will permit the baking pan to be filled with ingredients having a plurality of different colors or flavors and arranged in a predetermined order whereby the entire mass may be molded and baked in a homogeneous form.

Other objects and advantages will become apparent as the nature of the invention is more fully disclosed.

By the use of this device it is possible to bake a cake having a variegated and ornamental cross-section when cut which is often desired at social gatherings.

Figure 1:
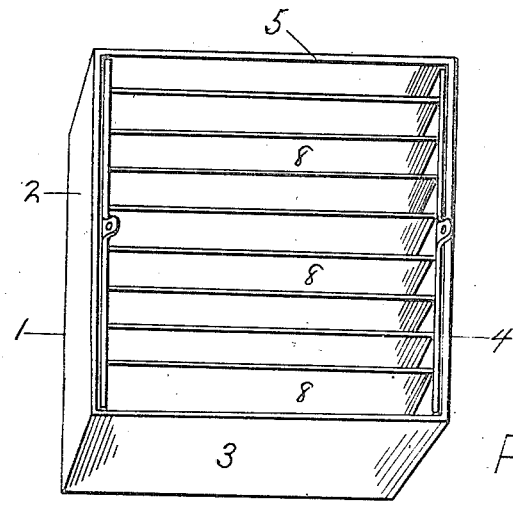
Figure 3:
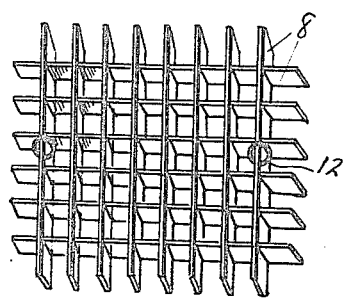
Figure 2:
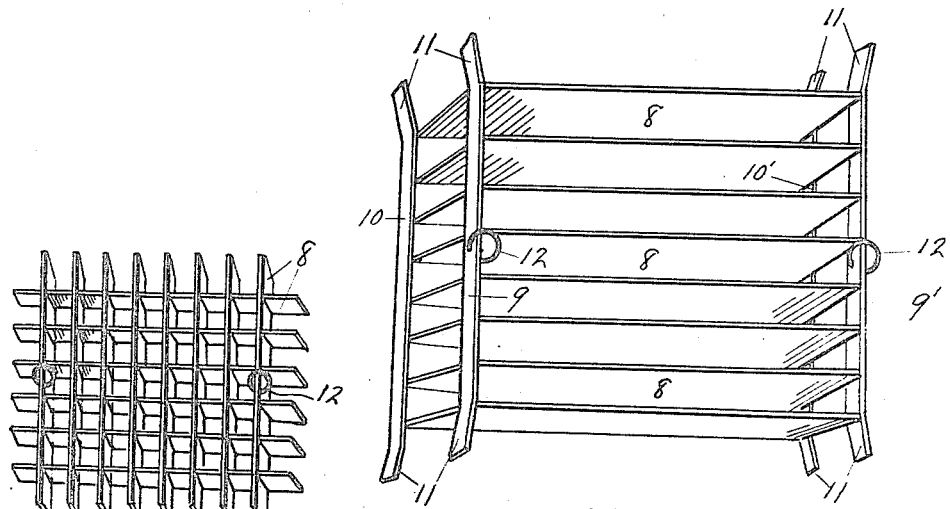

In the drawings, Figure 1 is a perspective view of the utensil with one of the molds inserted in the pan ready for use. Fig. 2 is a plan view of one of the insert molds, and Fig. 3 is a plan view of another form of insert mold.

Like reference characters refer to like parts throughout the drawings.

Referring to the drawings, the numeral 1 designates a baking pan, preferably rectangular in formation though other forms may be used, having the vertical sides 2, 3, 4 and 5. A mold is formed with a plurality of vertical partitions 8 held in spaced relation from one another and from the adjacent vertical sides of the pan by the pairs of horizontal bars 9—10, and 9'—10' attached to the upper and lower ends of said members. The outer ends 11 of said bars are preferably bent outwardly, as shown in the drawings, so as to permit the mold to be more securely held in the pan.

The said mold is made slightly smaller than the inside dimensions of the baking pan so that when it is inserted in the latter it will be held firmly therein by the sides of the latter. The vertical members 8 are as wide as the depth of the pan so that their bottom edges rest on the bottom of the latter when the mold is inserted therein. Rings 12 are secured to the upper bars 9—9' and provide means for lifting the mold from the pan when the latter is filled.

A number of molds having different arrangement of the vertical partitions may be provided by means of which numerous fanciful designs comprising a compound or cake may be formed.

In practice the pan in which the cake is to be baked is prepared in the usual manner for the reception of the ingredients of which the cake is to be made, the different flavored or colored ingredients being kept separated. A mold, as described, is then inserted in the pan so that it rests on the bottom thereof and the divisions of the mold are then filled with the different ingredients which are to comprise the cake, each division being filled with an ingredient of a different color or flavor in any predetermined order. When the mold is filled it is withdrawn from the pan by means of the rings attached to the former and the pan placed in the oven for baking. When baked the contents of the pan may be conveniently ejected in one entire homogeneous mass with each color or flavor bearing a distinct relation to the compound.

Having described my invention, what I claim is:

A culinary article comprising in combination, a pan and a molding device adapted to fit within the pan, said molding device comprising a plurality of blades extending across the pan and to the bottom thereof and pairs of rods adapted to secure said blades together in definite relation with one another, the outer ends of said rods being extended beyond the end blades and angularly bent whereby the mold may be resiliently secured within the pan.

MARY C. LEE.

Witnesses:
    E. M. MITCHELL,
    W. W. STERN.